May 16, 1933.  L. F. OVERHOLT  1,909,311
INTERNAL COMBUSTION ENGINE
Filed Feb. 16, 1931
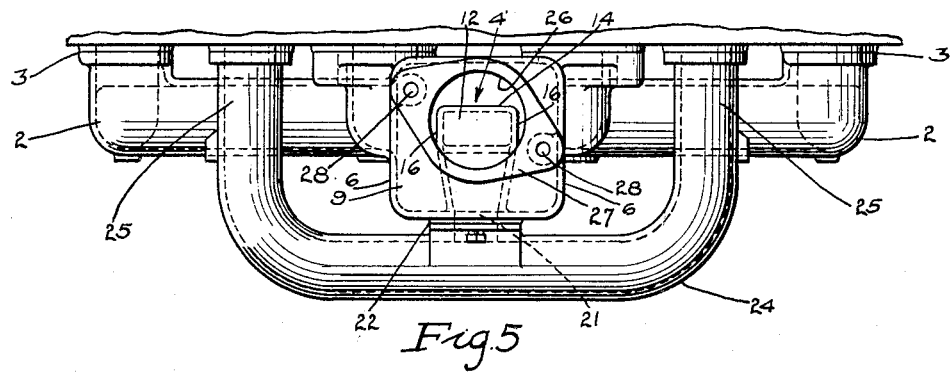
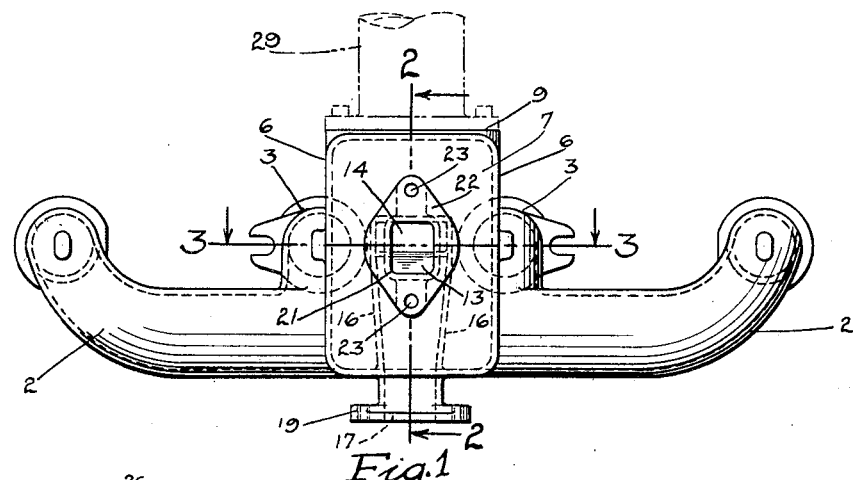
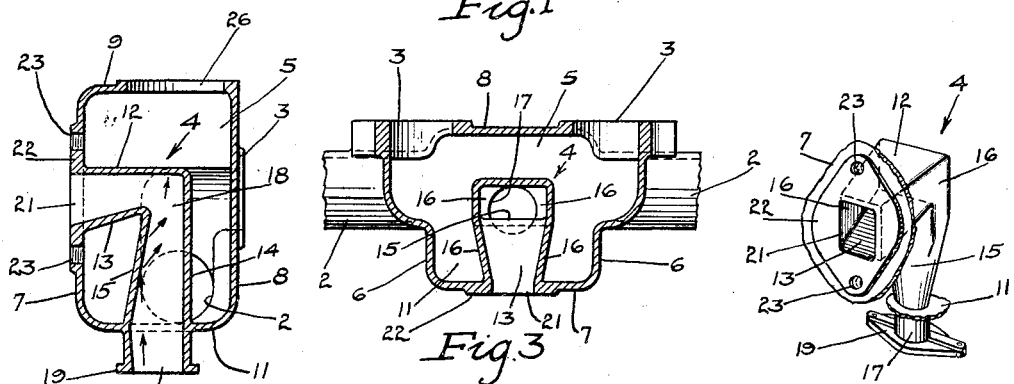
INVENTOR
LLOYD F. OVERHOLT
ATTORNEYS Patented May 16, 1933

1,909,311

UNITED STATES PATENT OFFICE

LLOYD F. OVERHOLT, OF MINNEAPOLIS, MINNESOTA, ASSIGNOR TO MINNEAPOLIS-MOLINE POWER IMPLEMENT COMPANY, OF HOPKINS, MINNESOTA, A CORPORATION OF DELAWARE

INTERNAL COMBUSTION ENGINE

Application filed February 16, 1931. Serial No. 515,935.

This invention relates to new and useful improvements in internal combustion engines, and more particularly to a novel means for preheating the fuel mixture before it is delivered into the combustion chambers of the cylinders.

An object of the invention is to provide an internal combustion engine having an improved exhaust manifold provided with means for preheating the fuel mixture.

A further object is to provide an exhaust manifold having a chamber therein communicating with the exhaust ports of the engine, and means being provided within said chamber for conducting the fuel mixture therethrough for the purpose of preheating it before it is delivered to the cylinders.

A further object is to provide an exhaust manifold having a relatively large chamber therein communicating with the exhaust ports of the engine, and a conduit of substantially right-angular configuration being disposed within said chamber and having its walls spaced from the walls of the chamber to permit fluid circulation therearound, said conduit having an end portion extending through the bottom wall of the chamber and provided with means whereby a carburetor may be secured thereto, and the opposite end of the conduit being secured to an upright wall of the chamber and provided with means for securing an intake manifold thereto, said conduit being so disposed within the chamber as to cause the hot exhaust gases from the engine to circulate around it and thus heat the walls thereof, whereby the raw fuel mixture passing through the conduit will impinge against the heated walls thereof and will be broken up and atomized before it is delivered to the combustion chambers.

A further object is to provide an exhaust manifold for an internal combustion engine, having a heating chamber therein traversed by a conduit having one end adapted to be connected to a carburetor and its opposite end to the intake manifold of the engine whereby all of the fuel delivered to the combustion chambers of the engine will pass through the conduit disposed within the heating chamber, said conduit being of substantially right-angular configuration and the intake end thereof being circular in cross-section, and the conduit above its intake and being rectangular in cross-section, and opposite walls thereof tapering outwardly to a point intermediate the ends of the conduit, and another wall tapering inwardly from the intake end of the conduit towards said point whereby the fuel passage in said conduit will be elongated; and said oppositely disposed tapering walls tapering inwardly from said intermediate point towards the outlet end of the conduit, and the other of said tapering walls tapering outwardly from said point, whereby the shape of the outlet of said conduit is changed cross-sectionally, the passage through said conduit being round at its intake, then changing to an elongated rectangular passage whose short dimension is less than the diameter of the passage at its intake end and said passage then changing from an elongated shape cross-sectionally to a rectangularly shaped passage at the discharge end of the conduit, whose vertical dimension is greater than its horizontal dimension, as shown in Figure 1.

The primary object of the invention therefore, is to provide in combination with an internal combustion engine, a simple and novel means for preheating the raw fuel mixture delivered to the combustion chambers of the engine, to cause it to be thoroughly atomized before reaching said chambers, and whereby low grade fuel oils, such as kerosene and distillates, may be efficiently used in lieu of gasoline.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 shows a front view of an exhaust manifold with the invention embodied in the construction thereof;

Figure 2 is a cross sectional view on the line 2—2 of Figure 1, showing the fuel conduit disposed within the heating chamber provided in the exhaust manifold;

Figure 3 is a sectional plan view on the line 3—3 of Figure 1;

Figure 4 is a perspective view illustrating the general shape of the conduit, the walls of the heating chamber being broken away; and Figure 5 is a plan view of the exhaust manifold showing the intake manifold of the engine connected therewith.

In the selected embodiment of the invention here shown, there is illustrated in Figures 1 and 2, an exhaust manifold comprising oppositely disposed tubular arms 2—2 adapted for connection with the exhaust ports of the end cylinders of a four cylinder internal combustion engine. Connections 3—3 are provided upon the manifold adapted for connection with the exhaust ports of the intermediate cylinders. The exhaust manifold is adapted to be secured to the engine block in the usual well-known manner.

When low grade oils such as kerosene and distillates are to be used as a fuel for an internal combustion engine, it is usually necessary to preheat the raw fuel mixture composed of oil and air before it reaches the combustion chambers of the engine, in order that it will be thoroughly atomized so as to be in a combustible state. Various attempts have been made to thus preheat the fuel mixture before reaching the cylinders, with more or less success. Overheating of the fuel mixture tends to reduce the volumetric efficiency of the engine, thereby reducing the horse power developed by the engine. It is desirable therefore, to provide means whereby the fuel mixture may be put in a combustible state with a minimum amount of heat applied to it and whereby, the fuel mixture before reaching the combustion chambers, will be thoroughly broken up and atomized so as to provide a combustible mixture which may be readily ignited when the engine is operated.

This invention provides means whereby the raw fuel mixture will travel from the carburetor through a tortuous passage having its walls heated, and, against which the fuel mixture impinges as it is drawn into the engine cylinders by the suction of the pistons, thereby causing the fuel mixture to be thoroughly broken up and atomized without overheating it, before reaching the combustion chamber.

The novel means herein disclosed for thus causing thorough atomization of the fuel mixture is best shown in Figures 2, 3, and 4, and comprises a conduit 4 disposed within a heating chamber 5 defined by end walls 6—6 and front and rear walls 7 and 8, respectively; and also top and bottom walls 9 and 11, all of which are here shown integrally formed with the exhaust manifold.

The conduit 4 is desirably shaped as shown in Figure 2, and is defined by walls 12, 13, 14, and 15, and the end walls 16. The walls 12 and 14 are shown disposed in right-angular relation, and the wall 15 tapers from the intake end 17 of the conduit inwardly to the elbow 18 of the conduit, thereby reducing the width of the passage through the conduit in a direction transversely of the manifold. The walls of the conduit within the heating chamber are connected with the bottom wall 11 of the chamber and project therethrough, as shown in Figures 1 and 2. Below the bottom wall 11, the walls of the conduit merge into a cylindrical shape, so as to provide a circular passage at the intake of the conduit, (see Figure 3.) The lower end of the conduit has a suitable flange 19 to provide means for securing a carburetor thereto in the usual manner.

The end walls 16 of the conduit 4 taper outwardly from the bottom wall 11 to the intermediate point or bend 18, as best shown in Figures 1 and 4, whereby the passage through the conduit at 18 is elongated in cross-section, the long dimension being in a direction lengthwise of the manifold. From the bend 18 in the conduit, the end walls 16 taper inwardly, as best shown in Figure 3, and the lower wall 13 of the upper portion of the conduit tapers outwardly or downwardly from the bend 18 so as to provide a rectangularly shaped passage 21 at the discharge end of the conduit whose vertical dimension is preferably greater than its horizontal dimension. The front wall 7 of the heating chamber has a pad 22 which encircles the discharge opening of the conduit 4 and is provided with suitable tapped holes 23 for securing the usual intake manifold 24 thereto in the usual manner, as shown in Figure 5. The intake manifold 24, as here shown, is U-shaped in form, and its spaced legs 25—25 are adapted to be connected with the intake ports of the combustion chambers in the usual manner.

By shaping the conduit 4 as herein disclosed, the fuel mixture is heated before reaching the intake manifold 24, thereby putting the fuel mixture in proper condition to distribute, resulting in uniformity of distribution to all of the engine cylinders. It will be understood that by reducing to a minimum, the metallic connections between the conduit 4 and the walls of the heating chamber 5, radiation and conduction of heat from the exhaust gases to the intake manifold at places where such heat is effective from an atomizing standpoint, is maintained at a minimum, thereby giving maximum volumetric efficiency.

A suitable discharge opening 26 is provided in the upper wall 9 of the heating chamber 5 surrounded by a suitable reinforcing pad 27 provided with tapped holes 28, whereby an exhaust pipe 29, of ordinary construction, may be secured thereto, as indicated in dotted lines in Figure 1.

In the operation of this novel fuel heating means, the fuel mixture received from the carburetor, composed of fuel and air, is drawn upwardly into the conduit 4 by the suction of the engine. Some of the heavier fuel particles will impinge against the inclined wall 15 and thereby be heated and atomized. Also, the change in shape of the fuel passage from round to a comparatively narrow rectangular shape, assists in making the air fuel mixture more homogeneous. At the bend or elbow 18 of the conduit, the heavier fuel particles are impinged against the upper wall 12 of the conduit. This surface is more intensely heated, and therefore as the fuel particles come in contact with it, they are immediately heated and atomized. The heavier fuel particles which may not be broken up and atomized in passing through the elbow 18, are directed against the upright walls 16—16 of the upper horizontal portion of the conduit, by reason of the fact that these walls taper inwardly in a direction towards the discharge end of the conduit, and also because the fuel particles, in passing from the elbow through the upper horizontal portion of the conduit, tend to follow the shortest paths out, which causes them to impinge against the walls 16—16 and be diverted into the flow of air fuel mixture being drawn through the conduit. The change in the shape of the passage in the conduit from the elbow 18 to the point of distribution of the air fuel mixture in the intake manifold 24, also tends to further improve the homogeneity of the fuel mixture. It will be noted that all of the above described actions of the air fuel mixture occur prior to its distribution to the various cylinders of the engine, which is highly beneficial since the distribution of the fuel mixture to the engine cylinders will be more uniform, as a result of the air fuel mixture having been thoroughly prepared before distribution commences.

Because of the walls of the conduit 4 being spaced from the walls of the heating chamber 5, the exhaust gases being discharged from the engine cylinders will circulate around the conduit so that its walls will be heated by the action of the exhaust gases before the latter are discharged to the atmosphere through the exhaust pipe 29. The connections 3—3 connecting the exhaust pipe with the intermediate cylinders of the engine are substantially horizontally alined with the upper horizontal portion of the conduit 4 so that all of the gases discharged from these cylinders may not circulate downwardly around the lower upright portion of the conduit, but will flow directly upwardly through the exhaust pipe 29. The arms 2—2 of the exhaust manifold, however, are connected with the heating chamber at its lower portion, and the exhaust gases passing through these arms to the heating chamber will circulate around the conduit 4 and thus heat the walls thereof.

By proper application of the heat of the exhaust gases to the air fuel mixture, made possible by the novel design of the conduit 4, heating chamber 5, and the location of the intake manifold 24 and its connection with the conduit 4, the fuel mixture may be properly atomized without heating it excessively, thereby maintaining volumetric efficiency at a maximum. The passage through the conduit, it will be noted, changes from a cylindrical to a narrow, elongated shape cross-sectionally of the conduit, at the bend 18, and from the bend 18, the walls of the horizontal portion of the conduit taper so that the shape of the passage at the discharge end of the conduit will be substantially rectangular in form, with its longest dimension in a vertical plane. By thus shaping the passage through the conduit 4, the fuel mixture, in passing through the conduit, will impinge, first against one wall of the conduit, and then against another, whereby it will be thoroughly broken up and atomized before reaching the combustion chambers.

I have found that by constructing the fuel heating and atomizing conduit 4 within the heating chamber 5, as above described, that the fuel mixture will not be overheated but will be heated sufficiently to permit kerosene and distillates to be efficiently used as a fuel. The construction of the fuel atomizing means also permits the use of gasoline without jeopardizing the operation of the engine.

I claim as my invention:

1. In an exhaust manifold for an internal combustion engine, a casing on said manifold whose walls define a heating chamber through which the exhaust gases from the engine may pass, a conduit disposed substantially entirely within said chamber and having its lower portion extending through the bottom wall of said casing, the opposite end of said conduit being connected with an upright wall of the casing and provided with means for connecting it to the intake manifold of the engine, and the walls of said conduit being spaced from the walls of said casing to permit free circulation of the exhaust gases therearound, whereby the walls of the conduit are heated for the purpose specified.

2. In an exhaust manifold for an internal combustion engine, a casing whose walls define a heating chamber through which the exhaust gases from the engine may pass, an L-shaped conduit disposed within said chamber and having one end portion connected with the bottom wall of the chamber and its opposite end portion with an upright wall thereof, the passage through said conduit being circular in cross-section at its intake end, and changing from a circular to a narrow, elongated passage at the bend in said conduit, and said passage changing from a narrow, elongated shape at the bend in said conduit to a rectangular opening at the discharge end thereof.

3. In an exhaust manifold for an internal combustion engine, a casing whose walls define a heating chamber through which the exhaust gases from the engine may pass, an L-shaped conduit disposed within said chamber and having one end portion connected with the bottom wall of the chamber and its opposite end portion with an upright wall thereof, the passage through said conduit being circular in cross-section at its intake end, and changing from a circular to a narrow elongated passage at the bend in said conduit with the long dimension of said passage extending in a direction lengthwise of the engine, and said passage changing from a narrow, elongated shape at the bend in said conduit to a rectangular opening at the discharge end thereof, and the vertical dimension of the discharge end being greater than the horizontal dimension thereof.

4. In an exhaust manifold for an internal combustion engine, a casing whose walls define a heating chamber through which the exhaust gases from the engine pass, an L-shaped conduit disposed within said chamber and having its lower end portion extending through the bottom wall of said casing and provided with means whereby a carburetor may be attached thereto, the opposite end of said conduit being connected with the front wall of said casing and provided with means whereby an intake manifold may be connected thereto, the passage through said conduit being circular in cross-section at its intake end, and opposite walls of said conduit tapering outwardly from the intake end of the conduit to the bend therein, and another wall tapering inwardly from the intake end thereof whereby a narrow, elongated passage is provided at the bend in said conduit, and two of the walls defining the horizontal portion of the conduit tapering inwardly from the bend therein towards the discharge end of the conduit, and the bottom wall of said horizontal portion tapering downwardly from said bend, whereby the opening at the discharge end of said conduit will be rectangular in cross-section, the tapering of said conduit walls causing the fuel oil, as it is drawn through the conduit by the suction of the engine, to impinge against said walls, whereby the fuel is diverted across said passage and thoroughly atomized before being delivered into the compression chambers of the engine.

5. In an exhaust manifold for an internal combustion engine, a casing whose walls define an enlarged pre-heating chamber through which the exhaust gases from the engine may circulate, an L-shaped conduit mounted substantially entirely within said chamber with its walls spaced from the walls of said chamber to permit circulation therearound, one end of said conduit projecting through a wall of said casing and adapted for connection with a carburetor and the opposite end thereof being adapted to be connected to an intake manifold, whereby all of the fuel mixture delivered to the intake manifold will pass through said conduit wherein it is preheated.

In witness whereof, I have hereunto set my hand this sixth day of February, 1931.

LLOYD F. OVERHOLT.